(12) United States Patent
Ellison et al.

(10) Patent No.: US 8,870,271 B2
(45) Date of Patent: Oct. 28, 2014

(54) VEHICLE COWL

(71) Applicant: Honda Motor Co., Ltd., Tokyo (JP)

(72) Inventors: Patrick J. Ellison, Dublin, OH (US);
David M. Edwards, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/797,960

(22) Filed: Mar. 12, 2013

(65) Prior Publication Data
US 2014/0265446 A1    Sep. 18, 2014

(51) Int. Cl.
*B62D 25/08*    (2006.01)
*B62D 25/10*    (2006.01)
*B60J 10/00*    (2006.01)

(52) U.S. Cl.
CPC ................................ *B62D 25/081* (2013.01)
USPC .................... 296/192; 296/193.11; 296/70

(58) Field of Classification Search
CPC ...... B62D 25/081; B62D 25/082; B60J 10/08
USPC ...................................... 296/192, 70, 193.11
See application file for complete search history.

(56) References Cited

U.S. PATENT DOCUMENTS

| | | |
|---|---|---|
| 4,765,672 A | 8/1988 | Weaver |
| 5,251,954 A | 10/1993 | Vande Kopple et al. |
| 6,682,131 B2 | 1/2004 | Hayashi |
| 7,316,447 B2 | 1/2008 | Kelly |
| 7,661,953 B2 | 2/2010 | Sekito et al. |
| 7,740,307 B2 | 6/2010 | Benvenuto et al. |
| 2003/0001411 A1 | 1/2003 | Gedritis et al. |
| 2003/0107243 A1 | 6/2003 | Hayashi |
| 2003/0205915 A1 | 11/2003 | Gedritis et al. |
| 2006/0087155 A1 | 4/2006 | Koyama et al. |
| 2008/0093891 A1 | 4/2008 | Benvenuto et al. |
| 2011/0049933 A1 | 3/2011 | Serizawa et al. |
| 2013/0221705 A1* | 8/2013 | SUGISHIMA et al. ...... 296/192 |

FOREIGN PATENT DOCUMENTS

GB          2249528 A  *  5/1992

* cited by examiner

*Primary Examiner* — Dennis H Pedder
(74) *Attorney, Agent, or Firm* — Rankin, Hill & Clark LLP

(57) ABSTRACT

A cowl member for a vehicle includes a grill portion with grill openings formed therein for taking in external air, a hood sealing portion disposed forwardly of the grill portion, and a hood seal integrally formed with the hood sealing portion. The cowl member further includes a vertical wall portion integrally formed with the hood sealing portion and extending downwardly relative thereto, and a plenum sealing portion integrally formed with a terminal edge of the vertical wall portion and extending forwardly relative thereto for sealing with a flange of a dashboard that separates an engine compartment from a passenger compartment on the vehicle.

21 Claims, 5 Drawing Sheets ial installation of the hood seal 22 and the second seal 26 is required. In contrast, the seals 42, 46 of the cowl member 30 of FIG. 2 require no

VEHICLE COWL

BACKGROUND

Vehicles often include a cowl disposed at a lower end of the vehicle's windshield and above the engine compartment for admitting exterior airflow into the vehicle's HVAC system. A dashboard is typically disposed below the cowl and is arranged to separate the engine compartment from the passenger compartment. The cowl can include a grill for taking in air from outside the vehicle. Typically, the cowls sealingly engages the lower end of the windshield and also the dashboard such that water passing through the grill is prevented from entering the engine compartment. The cowl can additionally sealingly engage the vehicle's hood disposed above the engine compartment.

SUMMARY

According to one aspect, a vehicle having a vehicle body with an engine compartment and a passenger compartment formed therein includes a dashboard of the vehicle body separating the engine compartment and the passenger compartment and a cowl mounted to the vehicle body. The dashboard includes a flange projecting forwardly into the engine compartment. The cowl has a grill formed therein for taking in external air. The cowl includes a hood sealing portion disposed forward of the grill and a hood seal integrally molded with the hood sealing portion and projecting upwardly from the hood sealing portion for sealing with a hood disposed over the engine compartment. The cowl further includes a vertical wall portion extending downward from the hood sealing portion and a plenum sealing portion integrally molded with the vertical wall portion and projecting forwardly from a lower end of the vertical wall portion for sealing with the flange of the dashboard.

According to another aspect, a cowl member for a vehicle includes a grill portion with grill openings formed therein for taking in external air, a hood sealing portion disposed forwardly of the grill portion, and a hood seal integrally formed with the hood sealing portion. The cowl member further includes a vertical wall portion integrally formed with the hood sealing portion and extending downwardly relative thereto, and a plenum sealing portion integrally formed with a terminal edge of the vertical wall portion and extending forwardly relative thereto for sealing with a flange of a dashboard that separates an engine compartment from a passenger compartment on the vehicle.

According to a further aspect, a vehicle cowl member includes a cowl body formed of a first material, the cowl body including a grill portion for taking in exterior air, a hood sealing portion disposed forwardly of the grill portion, and a vertical wall portion extending downwardly from the hood sealing portion toward a dashboard flange projecting forwardly into a vehicle engine compartment. The vehicle cowl member further includes a hood seal integrally molded and formed with the cowl body and a plenum sealing portion integrally molded and formed with the cowl body. The hood seal extends upward from the hood sealing portion into sealing contact with a hood disposed over the engine compartment. The plenum sealing portion extends forward from the vertical wall portion in overlapping relation on the dashboard flange. The plenum sealing portion includes a sealing segment extending downwardly into the sealing contact with the dashboard seal.

DETAILED DESCRIPTION

Figure 1:
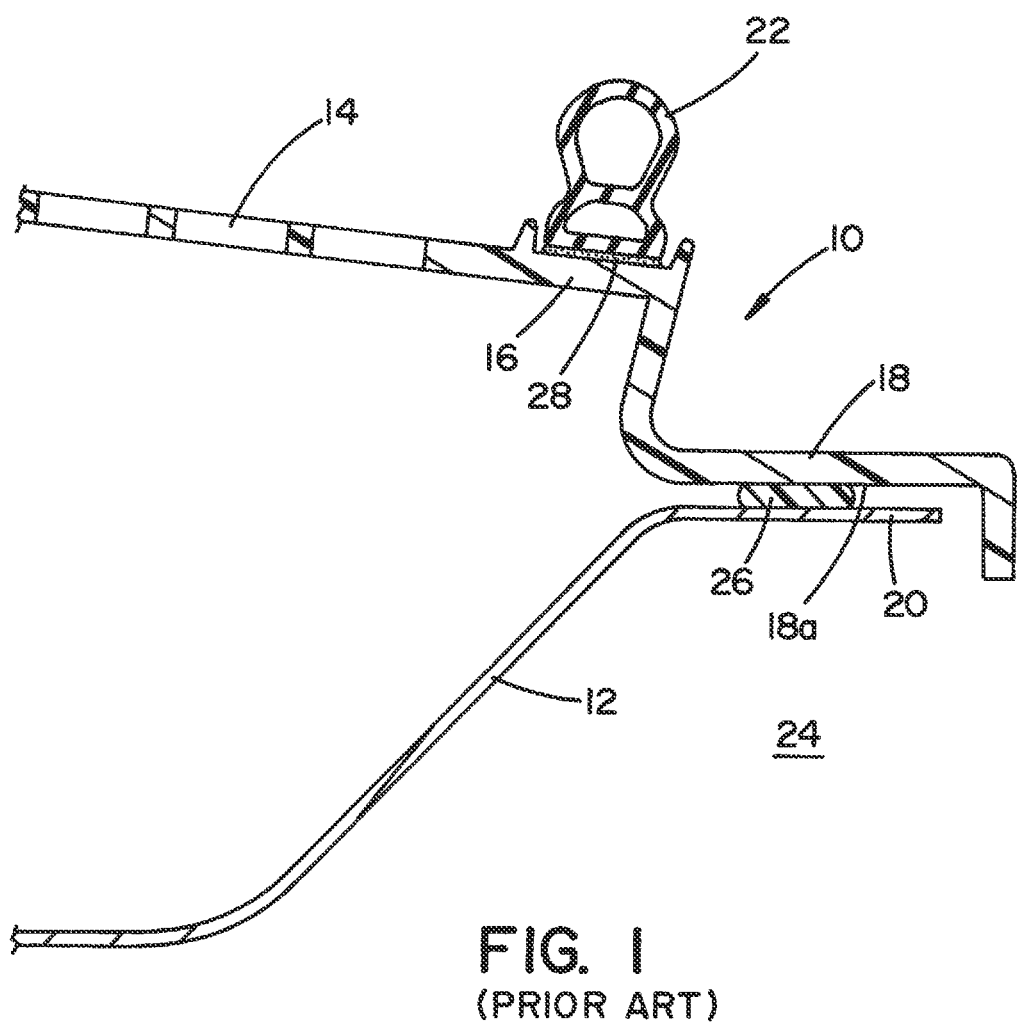
FIG. 1 is a partial cross-sectional view of a known cowl member.

FIG. 1 illustrates a known cowl member 10 mounted to a vehicle body, and particularly to a dashboard 12 of the vehicle body. The cowl member 10 has a grill 14 formed therein for taking in external air. The cowl member 10 includes a hood sealing portion 16 disposed forward of the grill 14 and a plenum sealing portion 18 integrally molded and formed with the hood sealing portion 16. The plenum sealing portion 18 overlaps a distal flange portion 20 of the dashboard 12. A hood seal 22 is disposed on the hood sealing portion 16 and is arranged to seal against a hood (not shown) to keep an engine compartment 24 defined forward and below the dashboard 12 free from water, debris, etc.

A second seal 26 is interposed between the plenum sealing portion 18, particularly in underside 18a thereof, and the distal flange portion 20 of the dashboard 12. The second seal 26 functions to keep an HVAC system (not shown) from sucking in hot air from the engine compartment 24. The overlapping structure of the plenum sealing portion 18 conceals the dashboard flange portion 20 from view when looking down into the engine compartment 24. This provides a clean appearance and also protects the dashboard flange portion 20 from any potential contact. The seal 22 can be an EPDN seal that is adhered or secured to the hood sealing portion 16 by an adhesive 28. The second seal 26 can be an EPT sealer that is injected or sprayed in position.

Figure 2:
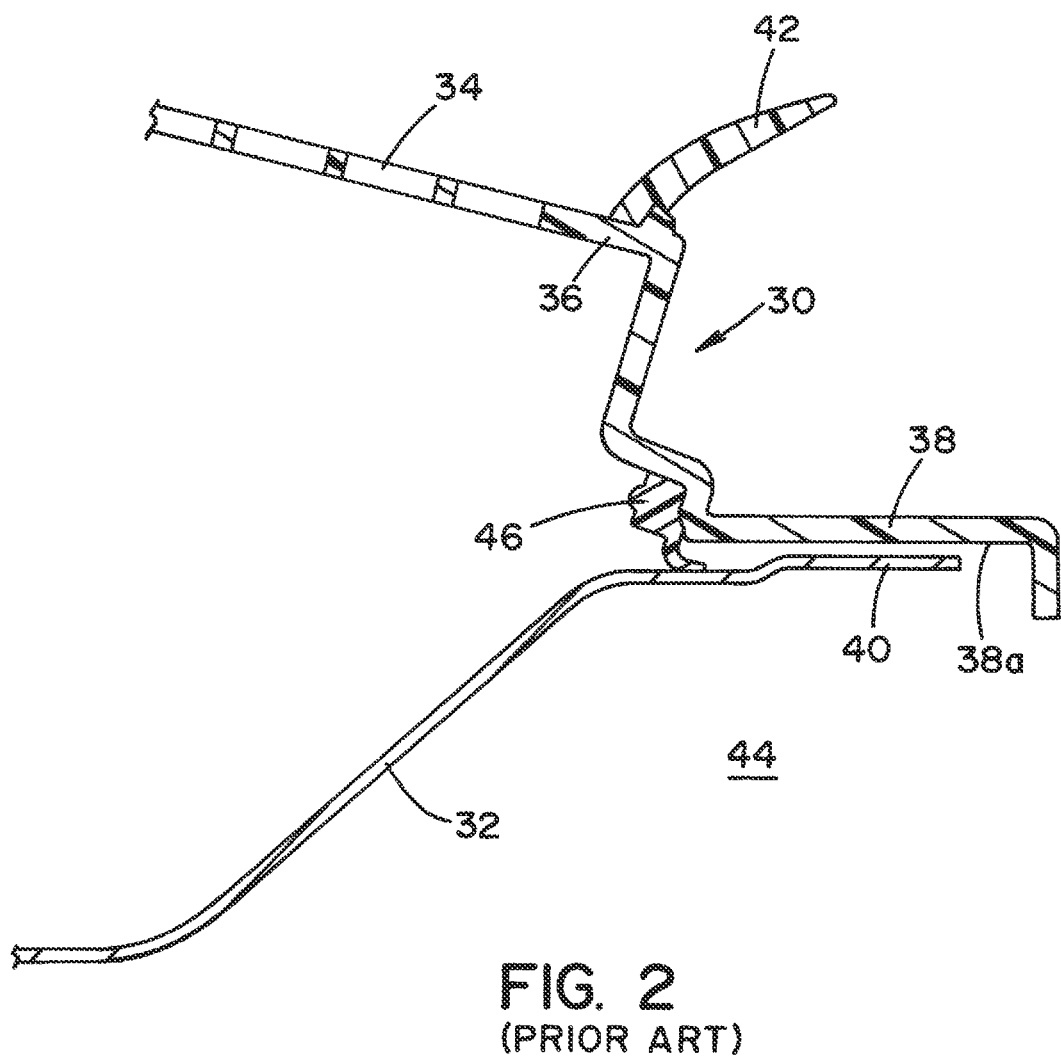
FIG. 2 is a partial cross-sectional view of another known cowl member.

FIG. 2 shows another known cowl member 30 that is mounted to a vehicle body, and particularly to a dashboard 32 thereof. The cowl member 30 has a grill 34 formed therein for taking in external air. Like the cowl member 10, the cowl member 30 includes a hood sealing portion 36 and a plenum sealing portion 38. The hood sealing portion 36 is disposed forward of the grill 34. The plenum sealing portion 38 is integrally molded and formed with the hood sealing portion 36 and is arranged in overlapping relation relative to a distal flange portion 40 of the dashboard 32. The cowl member 30 includes a hood seal 42 extending from the hood sealing portion 36 to keep an engine compartment 44 disposed forward and/or below the dashboard 32 free from water, debris, etc.

A second seal 46 is disposed rearwardly of a surface 38a and seals against the distal flange portion 40 of the dashboard 32. The seals 42, 46 can be integrally formed with the hood sealing portion 36 and plenum sealing portion 38, respectively. For example, the hood sealing portion 36 and plenum sealing portion 38 can be formed of a polypropylene and the seals 42, 46 can be formed of an thermal plastic olefin (e.g., TPO). Due to the location of the seal 42 on one side of the cowl member 30 and the seal 46 on a second, opposite side of the cowl member 30, the seals 44, 46 must be molded to the respective hood sealing portion 36 and plenum sealing portion 38 through a two-stage injection molding process.

In the cowl member 10 of FIG. 1, manual installation of the hood seal 22 and the second seal 26 is required. In contrast, the seals 42, 46 of the cowl member 30 of FIG. 2 require no manual assembly but do require an expensive slide in the molding die to create the seals 42, 46 on opposite sides of the cowl member 30. For example, each of the seals 42, 46 may necessitate a separate gating system since the seals are not connected to one another and are disposed on opposite sides of the cowl member 30. The cowl member 30 illustrated in FIG. 2 has an advantage over the cowl member 10 illustrated in FIG. 1 when used on a vehicle with a high production volume because extra assembly manpower (i.e., manual assembly) is not necessary; however, if vehicle production volume is low, then the cowl member 10 illustrated in FIG. 1 has the advantage in that an expensive slide die assembly is not needed.

Figure 3:
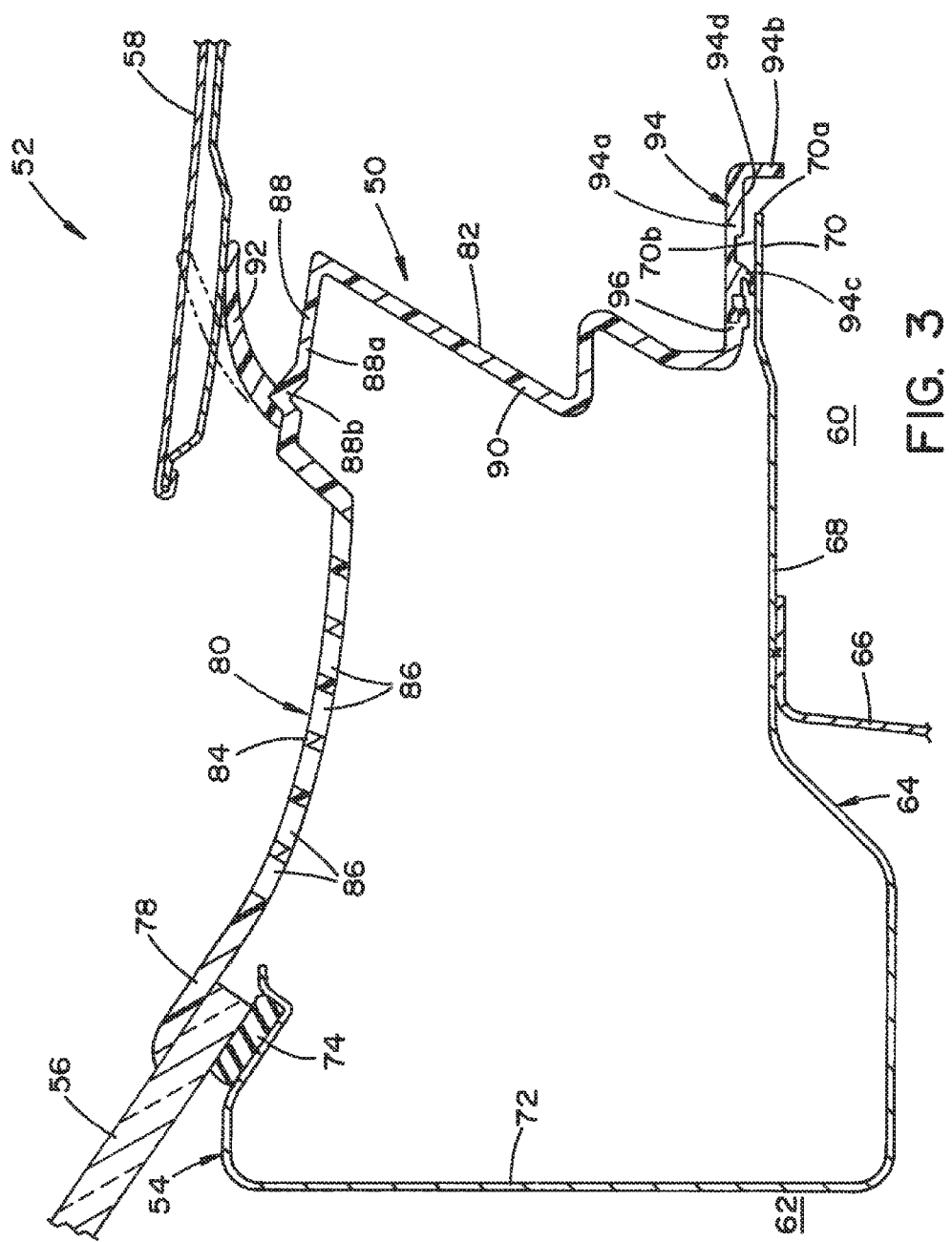
FIG. 3 is a cross-sectional view of a cowl member according to an exemplary embodiment.
Figure 4:
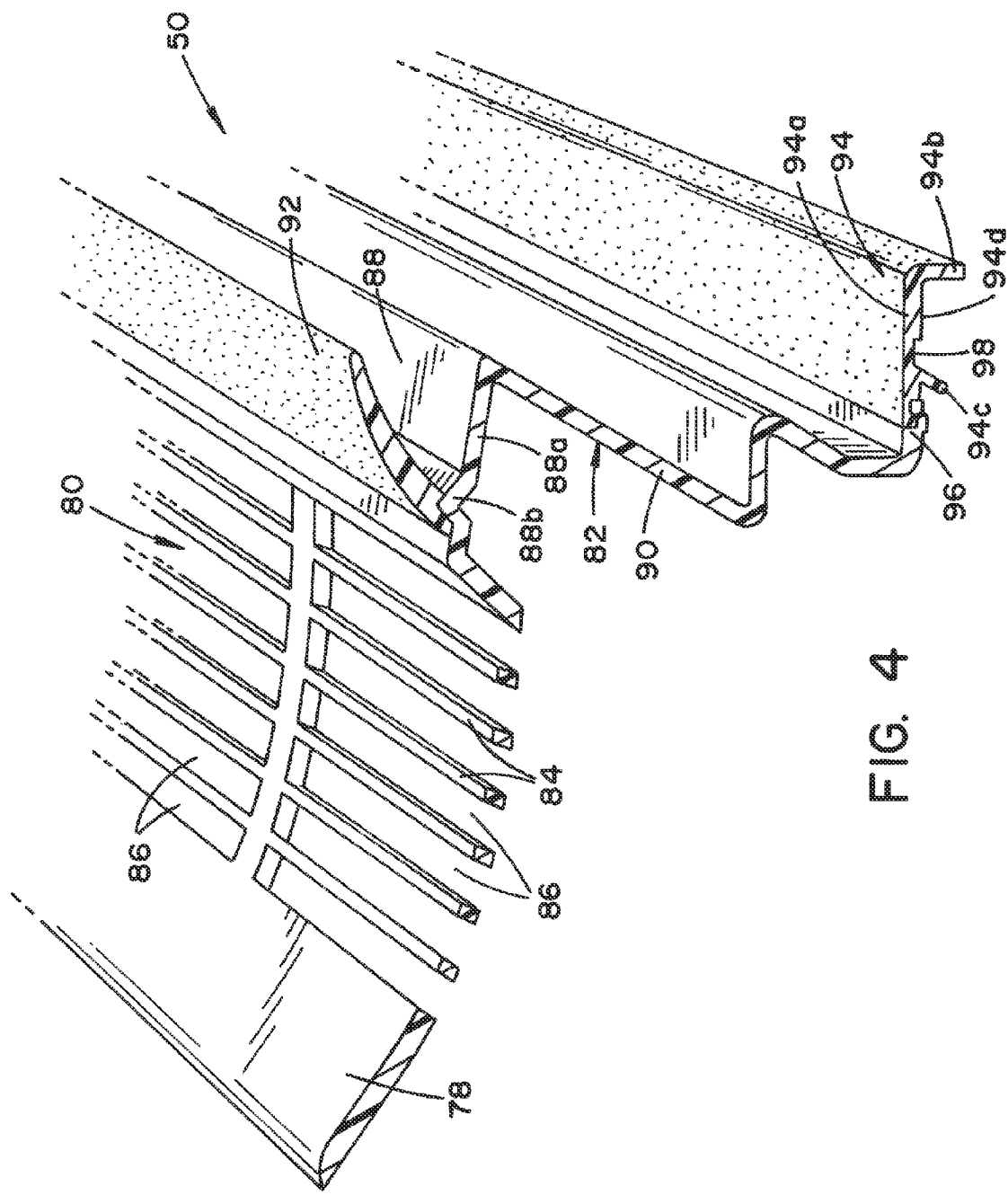
FIG. 4 is a partial perspective view, with portions shown in cross-section, of the cowl member of FIG. 3.
Figure 5:
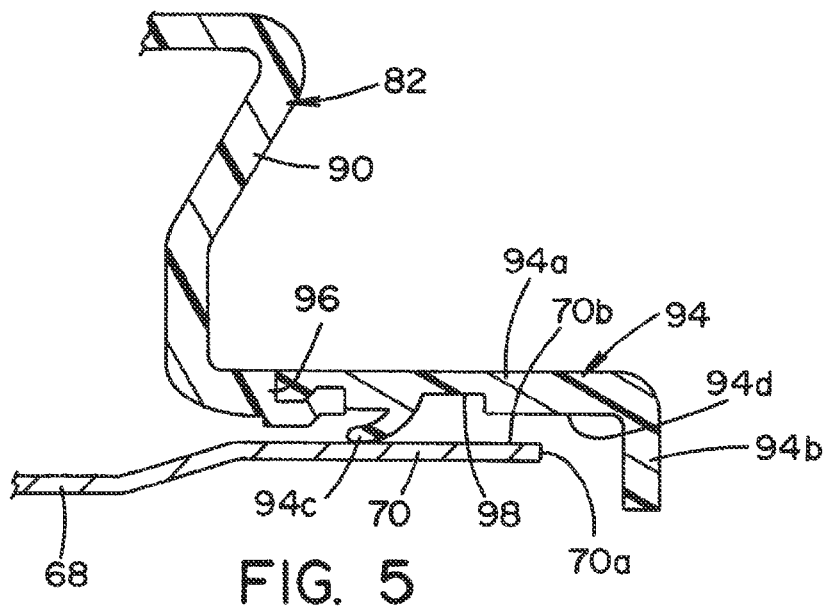
FIG. 5 is a partial enlarged view of the cowl member of FIG. 3 showing a plenum sealing portion.
Figure 6:
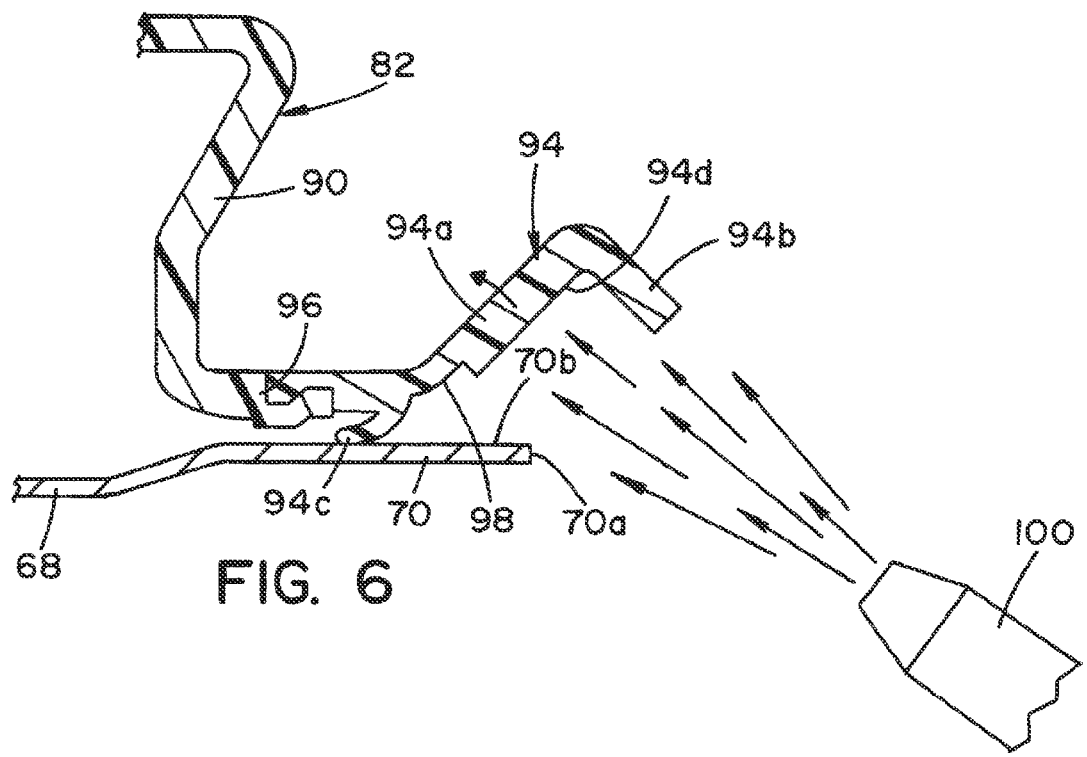
FIG. 6 is a view similar to FIG. 5 but showing high pressure spray being directed toward the plenum sealing portion.

Referring now to FIGS. 3-6, wherein the showings are for purposes of illustrating one or more exemplary embodiments and not for purposes of limiting same, a cowl or cowl member 50 for a vehicle will be described according to one exemplary embodiment. As best shown in FIG. 3, a vehicle 52 includes a vehicle body 54. The vehicle body 54 has a windshield 56 and the cowl 50 mounted thereto. The cowl 50 extends forwardly from a lower portion of the windshield 56. A hood 58 is positioned in front of the cowl 50. The vehicle body 54 has an engine compartment 60 and a passenger compartment 62 formed therein (i.e., the vehicle body 54 defines the compartments 60, 62). A dashboard 64 of the vehicle body 54 separates the engine compartment 60 and the passenger compartment 62 as is known and understood by those skilled in the art.

In the illustrated embodiment, the dashboard 64 includes a vertically oriented lower panel or wall 66 and a horizontally oriented upper panel or wall 68 joined to an upper portion of the lower wall 66. The dashboard 64, and particularly the upper wall 68 of the illustrated embodiment, includes a dashboard flange 70 projecting forwardly into the engine compartment 60. The dashboard 64 further includes a windshield lower panel or wall 72 that extends downwardly from the lower portion of the windshield 56. More particularly, in the illustrated embodiment, an upper end of the wall 72 is configured to support the lower end of the windshield 56 with a seal 74 arranged so as to be interposed between the wall 72 and the windshield 56. In the illustrated embodiment, the wall 72 is integral with the wall 68, though this is not required and these walls could be formed by separate panels that are then welded to one another.

The cowl 50 is mounted to the vehicle body 54, and particularly to the dashboard 64 thereof. The cowl 50 includes a windshield portion 78 for mounting to or against the windshield 56 and includes a grill 80 formed therein for taking in external air. More particularly, the cowl 50 includes a cowl body 82 formed of a first material. The cowl body 82 includes the windshield portion 78 and a grill portion 84 defining the grill 80 for taking in the exterior air. As shown, the grill portion has a large number of grill openings or apertures 86 formed therein that comprise the grill 80. The cowl body 82 additionally includes a hood sealing portion 88 disposed forward of the grill 80 and, thus, forwardly of the grill portion 84 and the windshield portion 78, and a vertical wall portion 90 extending downwardly from the hood sealing portion 88 toward the dashboard flange 70 projecting forwardly into the vehicle engine compartment 60. In particular, the vertical wall portion 90 is integrally formed with the hood sealing portion 88 and extends downwardly relative thereto. Likewise, the hood sealing portion and the vertical wall portion can both be integrally formed with the grill portion 84 and the windshield portion 78.

The cowl 50 additionally includes a hood seal 92 integrally molded and formed with the cowl body 82, and particularly integrally formed with the hood sealing portion 88. The hood seal 92 extends or projects upwardly from the hood sealing portion 88 into sealing contact with the hood 58 disposed over the engine compartment 60 for sealing with the hood 58. The cowl 50 additionally includes a plenum sealing portion 94 integrally molded with the vertical wall portion 90 and projecting forwardly from a lower end of the vertical wall portion 90 for sealing with the flange 70 of the dashboard 64. More particularly, the plenum sealing portion 94 is integrally formed with a distal terminal end or edge 96 of the vertical wall portion 90 and extends forwardly relative thereto for sealing with the flange 70 of the dashboard 64 that separates the engine compartment 60 from the passenger compartment 62 on the vehicle 52. As will be described in more detail below, the plenum sealing portion 94 can be integrally molded and formed with the cowl body 82. In the illustrated embodiment, the plenum sealing portion 94 extends forward from the vertical wall portion 90, particularly the terminal edge 96 in overlapping relation on the dashboard flange 70.

As mentioned, the cowl body 82 is formed of a first material. In particular, the windshield portion 78, the grill portion 84, the hood sealing portion 88 and the vertical wall portion 90 are integrally formed of the first material. In contrast, the hood seal 92 and the plenum sealing portion 94 are formed of a second material. In one embodiment, the second material is less rigid than the first material. In one particular embodiment, the first material is a thermoplastic material such as polypropylene and the second material is a thermoplastic material or thermoplastic olefin, such as TPO. The second material allows for better sealing performance, whereas the first more rigid material provides for better structural integrity. Together, the cowl body 82, the seal 92 and the portion 94 form a unitary structure (i.e., form a single component).

More particularly, the plenum sealing portion 94 of the illustrated embodiment extends from the terminal end 96 of the vertical wall portion 90 and forms a forward-most projecting portion of the cowl 50. The plenum sealing portion 94 overlaps the flange 70 of the dashboard 64 to conceal the flange 70 from downward viewing into the engine compartment 60. In addition, the plenum sealing portion 94 protects the flange 70 from contact. Specifically, in the illustrated embodiment, the plenum sealing portion 94 is generally L-shaped including a first segment 94a disposed in parallel on an upper side of the flange 70 and a second segment 94b extending downward in approximate perpendicular relation to the first segment 94a for overlapping a forward edge 70a of the flange 70.

The plenum sealing portion 94 further includes a sealing segment 94c extending downward from an underside 94d of the first segment 94a for or into sealing contact with the dashboard flange 70, particularly with an upper side 70b thereof. In the illustrated embodiment, the plenum sealing segment 94c specifically extends downwardly and rearwardly relative to the plenum sealing portion 94 into contact with the upper side 70b of the flange 70 of the dashboard 64. Thus, the sealing segment 94c of the illustrated embodiment is obliquely oriented so as to extend both downwardly and rearwardly relative to a direction of travel of the vehicle and relative to a height of the vehicle. Though not shown, in alternate embodiments, the sealing segment 94c could extend only downwardly (i.e., and not be obliquely oriented) or could extend downwardly and forwardly relative to the plenum sealing portion 94 (i.e., be obliquely oriented so as to extend both downwardly and forwardly relative to a direction of travel of the vehicle and relative to a height of the vehicle).

In the illustrated embodiment, the plenum sealing portion 94 defines a notch 98 on the underside 94d thereof forward of the sealing segment 94c for enabling pivotal movement of the plenum sealing portion 94 under force. Thus, the notch 98 is formed in the underside 94d of the plenum sealing portion 94 forward of the sealing segment 94c for allowing pivotal movement of the plenum sealing portion 94 forward of the notch 98 at approximately a location of the notch 98. With specific reference to FIG. 6, the notch 98 allows the plenum sealing portion 94 to pivotally move under force in a direction away from the flange 70. This allows the sealing segment 94c to remain in sealing contact with the flange 70 when force, such as water pressure provided by a pressure nozzle 100 (e.g., of a power washer) is directed in the engine compartment 60 toward the plenum sealing portion 94. Accordingly, the plenum sealing portion 94 does not fracture but yields under force while maintaining sealing contact between the plenum sealing segment 94c and the flange 70.

In the illustrated embodiment, the hood sealing portion 88 has a generally inverted U-shape with the hood seal extending from a bridge segment 88a thereof. As shown, the bridge segment 88a can be elevated relative to the grill portion 84, at least a lower end of the grill portion 84. The hood seal 92 extends upwardly and forwardly relative to the hood sealing portion 88. As shown, the hood sealing portion 88, and particularly the bridge segment 88a thereof, can include a protrusion 88b for providing structure to which the hood seal 92 can be more easily molded (e.g., overmolded) and thereby secured to the cowl body 82. By this arrangement, the hood seal 92 extends obliquely upwardly and forwardly while the sealing segment 94c of the plenum sealing portion 94 extends obliquely downwardly and rearwardly. Advantageously, this occurs while the hood seal 92 and the plenum sealing portion 94 are both disposed on the same side of the cowl 50 which enables simultaneous molding from a single injector. Accordingly, the cowl 50 can be produced at a much reduced cost relative to the cowl 30 of FIG. 2 requiring a complicated slide-type molding die. Additionally, the cowl 50 has the same advantage as the cowl 30 over the cowl 10 of FIG. 1 in that no manual labor is required to attach the seals to the cowl body.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle having a vehicle body with an engine compartment and a passenger compartment formed therein, the vehicle comprising:
   a dashboard of the vehicle body separating the engine compartment and the passenger compartment, the dashboard including a flange projecting forwardly into the engine compartment; and
   a cowl mounted to the vehicle body and having a grill formed therein for taking in external air, the cowl including:
   a hood sealing portion disposed forward of the grill,
   a hood seal integrally molded with the hood sealing portion and projecting upwardly from the hood sealing portion for sealing with a hood disposed over the engine compartment,
   a vertical wall portion extending downward from the hood sealing portion, wherein the hood sealing portion and the vertical wall portion are integrally formed of a first material, and
   a plenum sealing portion integrally molded with the vertical wall portion and projecting forwardly from a lower end of the vertical wall portion for sealing with the flange of the dashboard, and wherein the hood seal and the plenum sealing portion are integrally formed of a second material, the second material less rigid than the first material.

2. The vehicle of claim 1 wherein the second material is a thermoplastic olefin.

3. The vehicle of claim 1 wherein the plenum sealing portion extends from a distal terminal end of the vertical wall portion and forms a forward-most projecting portion of the cowl.

4. The vehicle of claim 3 wherein the plenum sealing portion overlaps the flange of the dashboard to conceal the flange from downward viewing into the engine compartment.

5. The vehicle of claim 4 wherein the plenum sealing portion is generally L-shaped including a first segment disposed in parallel on an upper side of the flange and a second segment depending downward in approximate perpendicular relation to the first segment for overlapping for forward edge of the flange.

6. The vehicle of claim 5 wherein the plenum sealing portion further includes sealing segment extending downwardly from an underside of the first segment for sealing contact with an upper side of the flange.

7. The vehicle of claim 6 wherein the sealing segment is obliquely oriented so as to extend both downwardly and rearwardly.

8. The vehicle of claim 6 wherein a notch is formed in an underside of the plenum sealing portion forward of the sealing segment for allowing pivotal movement of the plenum sealing portion forward of the notch at approximately a location of the notch.

9. The vehicle of claim 3 wherein the plenum sealing portion includes a sealing segment extending downwardly into sealing contact with an upper side of the flange.

10. The vehicle of claim 9 wherein the plenum sealing portion defines a notch in an underside thereof forward of the sealing segment allowing the plenum sealing portion to pivotally move under force in a direction away from the flange.

11. The vehicle of claim 1 wherein the hood sealing portion has a generally inverted U-shape with the hood seal extending from a bridge segment thereof.

12. The vehicle of claim 1 wherein the hood seal and the plenum sealing portion are both disposed on a same side of the cowl for simultaneous molding from a single injector.

13. The vehicle of claim 12 wherein the hood seal extends obliquely upwardly and forwardly, and a sealing segment of the plenum sealing portion extends obliquely downwardly.

14. A cowl member for a vehicle, comprising:
   a grill portion with grill openings formed therein for taking in external air;
   a hood sealing portion disposed forwardly of the grill portion;
   a hood seal integrally formed with the hood sealing portion;
   a vertical wall portion integrally formed with the hood sealing portion and extending downwardly relative thereto; and
   a plenum sealing portion integrally formed with a terminal edge of the vertical wall portion and extending forwardly relative thereto for sealing with a flange of a dashboard that separates an engine compartment from a passenger compartment on the vehicle, wherein the hood sealing portion and the vertical wall portion are formed of a first material and the hood seal and the plenum sealing portion are formed of a second, different material.

15. The cowl member of claim 14 wherein the second material is less rigid than the first material.

16. The cowl member of claim 15 wherein hood seal extends upwardly and forwardly relative to the hood sealing portion, and the plenum sealing portion includes a sealing segment extending downwardly at an angle relative to the plenum sealing portion into contact with an upper side of the flange of the dashboard, and further wherein the plenum sealing portion has an L-shape that overlaps the flange of the dashboard.

17. The cowl member of claim 16 wherein the plenum sealing portion defines a notch on an underside thereof forward of the sealing segment for enabling pivotal movement of the plenum sealing portion under force.

18. The cowl member of claim 14 further including a windshield portion disposed rearwardly of the grill portion for mating with a windshield.

19. A vehicle cowl member, comprising:
a cowl body formed of a first material, the cowl body including a grill portion for taking in exterior air, a hood sealing portion disposed forwardly of the grill portion and a vertical wall portion extending downwardly from the hood sealing portion toward a dashboard flange projecting forwardly into a vehicle engine compartment; and
a hood seal integrally molded and formed with the cowl body, the hood seal extending upward from the hood sealing portion into sealing contact with a hood disposed over the engine compartment, and wherein the hood sealing portion has a generally inverted U-shape with the hood seal extending from a bridge segment thereof; and
a plenum sealing portion integrally molded and formed with the cowl body, the plenum sealing portion extending forward from the vertical wall portion in overlapping relation on the dashboard flange, the plenum sealing portion including a sealing segment extending downwardly into sealing contact with the dashboard flange.

20. The vehicle of claim 19 wherein the plenum sealing portion defines a notch in an underside thereof forward of the sealing segment allowing the plenum sealing portion to pivotally move under force in a direction away from the flange.

21. The vehicle of claim 19 wherein the hood sealing portion and the vertical wall portion are integrally formed of a first material, and wherein the hood seal and the plenum sealing portion are integrally formed of a second material, the second material less rigid than the first material.

* * * * *